United States Patent [19]

Csathy et al.

[11] E Re. 30,033

[45] Reissued Jun. 19, 1979

[54] VERTICAL FIRETUBE WASTE HEAT BOILER

[75] Inventors: Denis G. Csathy; Wendell L. Y. Hung, both of Minneapolis; Jon M. Heath, New Brighton, all of Minn.

[73] Assignee: Deltak Corporation, Minneapolis, Minn.

[21] Appl. No.: 890,553

[22] Filed: Mar. 20, 1978

Related U.S. Patent Documents

Reissue of:

[64] Patent No.: 3,976,033
Issued: Aug. 24, 1976
Appl. No.: 600,438
Filed: Jul. 30, 1975

[51] Int. Cl.[2] ..... F22B 1/18; F22B 9/04

[52] U.S. Cl. ..... 122/7 R; 122/114

[58] Field of Search ..... 122/7 R, 7 B, 114, 115

[56] References Cited

U.S. PATENT DOCUMENTS

| | | | |
|---|---|---|---|
| 934,679 | 9/1909 | Lea | 122/114 X |
| 1,812,513 | 6/1931 | Chrisman | 122/7 |
| 1,907,736 | 5/1933 | Cheetham et al. | 122/114 X |
| 1,973,968 | 9/1934 | Weigel et al. | 122/114 X |
| 2,048,308 | 7/1936 | Welter | 122/114 X |

*Primary Examiner*—Kenneth W. Sprague
*Attorney, Agent, or Firm*—Ira Milton Jones & Associates

[57] ABSTRACT

A vertical firetube boiler in which the upper tube sheet has a dished formation to coact with an annular baffle spaced down from the peripheral portion of the upper tube sheet, to cause the circulating steam-water mixture in the boiler to flow radially outward along the underside of the upper tube sheet to a circular row or belt of holes that open to an annular steam collecting chamber.

5 Claims, 7 Drawing Figures

VERTICAL FIRETUBE WASTE HEAT BOILER

Matter enclosed in heavy brackets [ ] appears in the original patent but forms no part of this reissue specification; matter printed in italics indicates the additions made by reissue.

This invention relates generally to steam generating boilers and more particularly to vertical firetube waste heat boilers especially suited for the cooling of process gas. When used for that purpose, the boilers abstract heat from the hot process gas flowing through the tubes. This, of course, cools the gas and, in addition, usefully utilizes the heat energy contained in the gas by producing steam or hot water.

Vertical firetube boilers have been in existence for a long time, but—as is well known to those skilled in the art—this type of boiler has a very poor operating history. Invariably these boilers fail long before other types of boilers give any evidence of difficulty. The unreliability of prior vertical firetube boilers thus outweighed the advantages that stem from their simple design and construction.

The Achilles heel of the vertical firetube boilers heretofore available was their inability to cope with steam blanketing of the upper tube sheet.

For those who may not be familiar with the design of vertical firetube boilers, it may be well to briefly explain that, in these boilers, a vertically oriented bank or group of tubes has the opposite ends thereof welded or otherwise secured to upper and lower tube sheets. The peripheral edges of these tube sheets are welded to a cylindrical shell so that the tube sheets and the shell coact to form a closed vessel through which a steam-water mixture continually circulates.

The steam-water mixture rises in the vessel and leaves at its top to be conducted to a steam drum located at an elevation above that of the boiler. Here the steam and water separate, the steam to be withdrawn and conducted to a point of use and the water to be returned to the bottom of the vessel through an exteriorly located duct known in the art as a downcomer.

Usually in boilers of this type the hot gas flows downwardly through the tubes; in which case the space above the upper tube sheet constitutes a manifold to distribute the incoming hot gas to all of the firetubes. As this gas flows down through the firetubes, it is cooled by indirect heat exchange with the water in the boiler. Hence, by the time the gas reaches the space below the lower tube sheet, it has lost much of its heat energy.

The accumulation of steam on the underside of the upper tube sheet—"steam blanketing" as it is called—causes the joints between this tube sheet and the tubes to loosen and leak. It will also often crack the hot upper tube sheet. Needless to say, neither of these consequences can be tolerated.

In view of this very serious weakness of vertical firetube boilers, some way of preventing steam blanketing of the upper tube sheet had to be found.

The present invention has achieved that objective, and has done so in a very simple and practicable way.

The solution to the problem lay in so shaping the upper tube sheet that, by the natural circulation of the water-steam mixture through the boiler, steam is prevented from accumulating on the tube sheet. To that end, the peripheral edge of the upper tube sheet which is secured to the shell of the boiler, is at a level substantially higher than the center of the tube sheet. A dished formation of the upper tube sheet is ideally suited to this purpose, but a conical shape can also be used.

In any event, the shape of the upper tube sheet coacts with an annular baffle located a short distance down from the peripheral portion of the upper tube sheet to effect a positive flow of the steam-water mixture radially outward along the underside of the tube sheet, and this prevents the accumulation of stagnant steam bubbles on the tube sheet.

The steam-water mixture flowing radially outward along the underside of the upper tube sheet passes through holes in the wall of the vessel that open to an annular receiving chamber encircling the upper portion of the boiler. This annular chamber is connected with the steam drum of the boiler by ducts referred to in the industry as releaser nozzles which debouch into the steam drum.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which.

Figure 1:
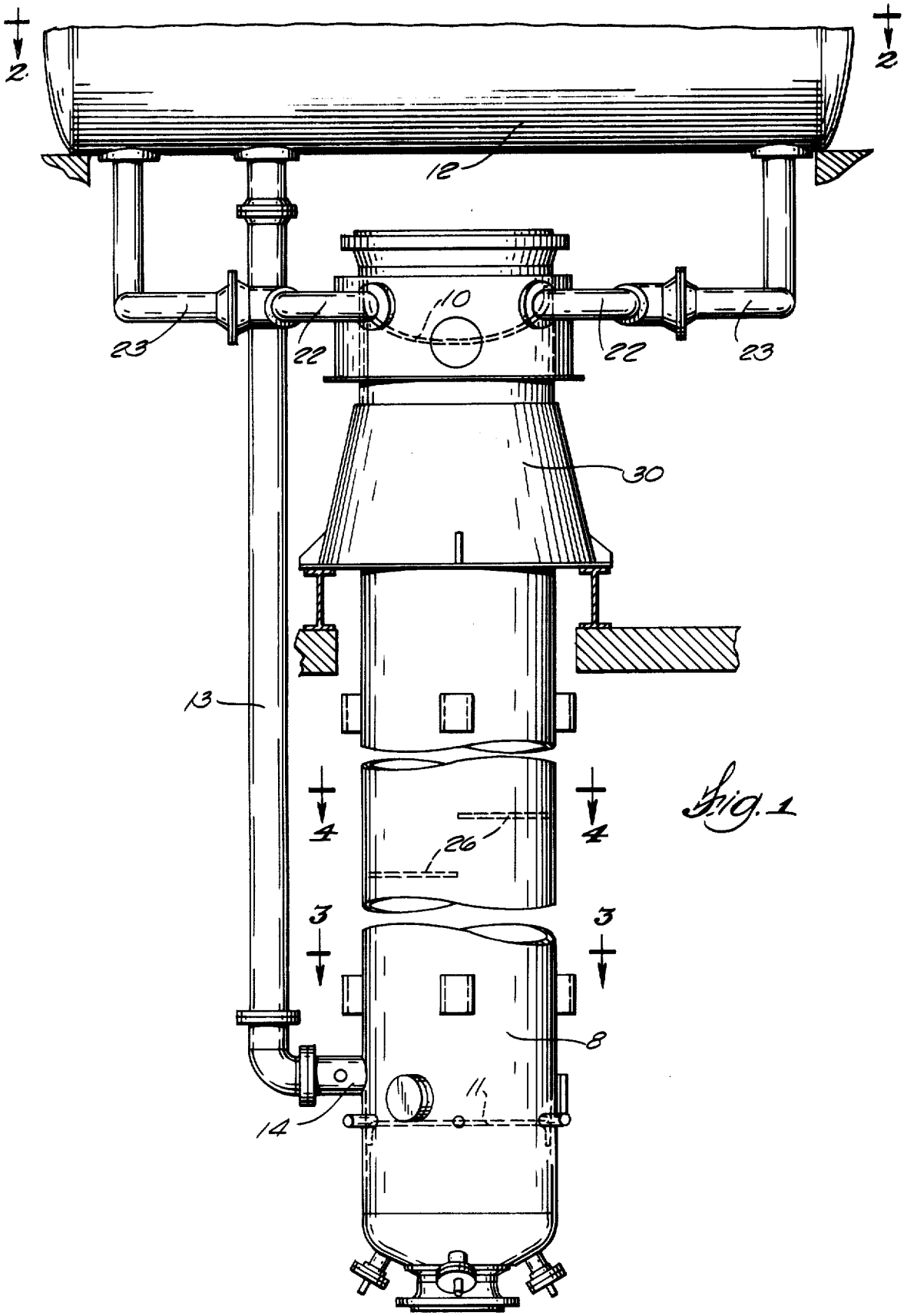
FIG. 1 is a side view of a vertical firetube boiler embodying this invention.
Figure 2:
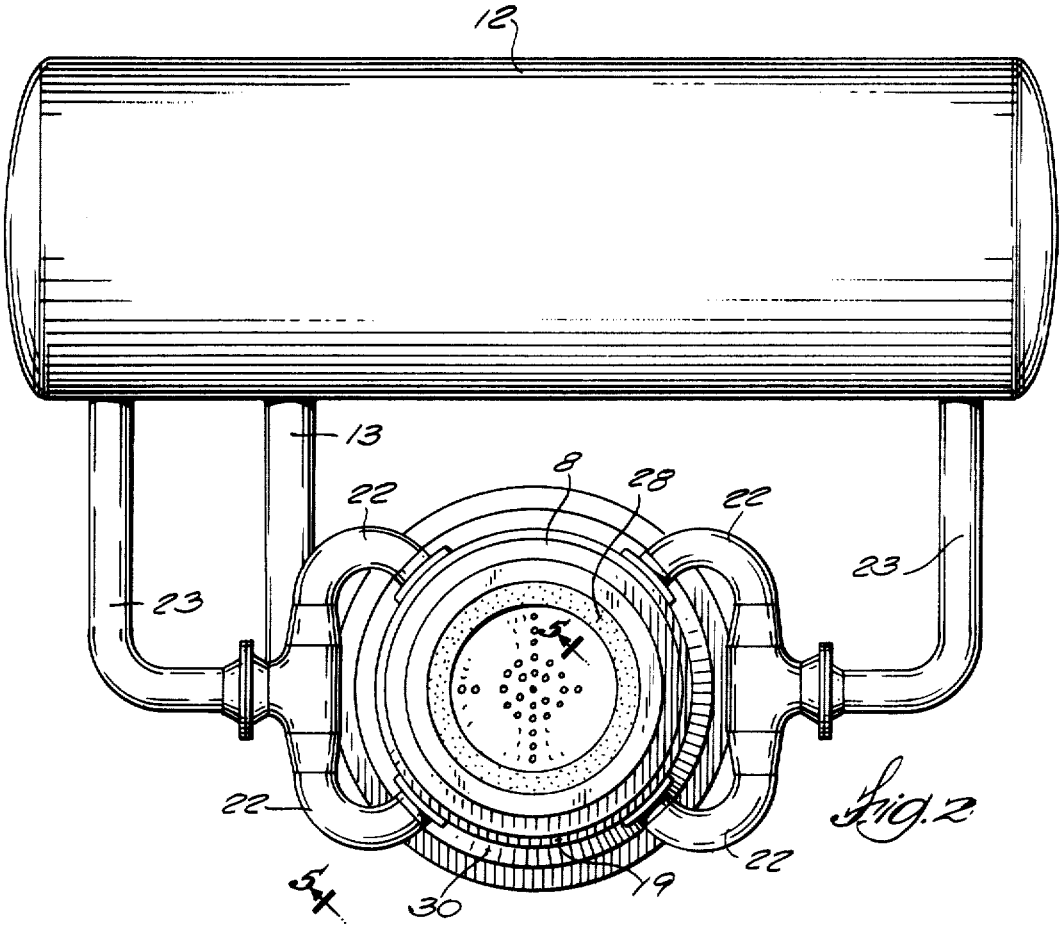
FIG. 2 is a top view of the boiler.
Figure 3:
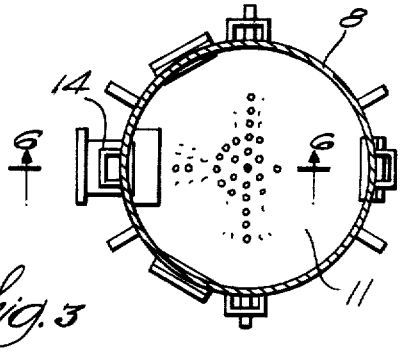
FIG. 3 is a horizontal cross sectional view through FIG. 1 on the plane of the line 3—3.
Figure 7:
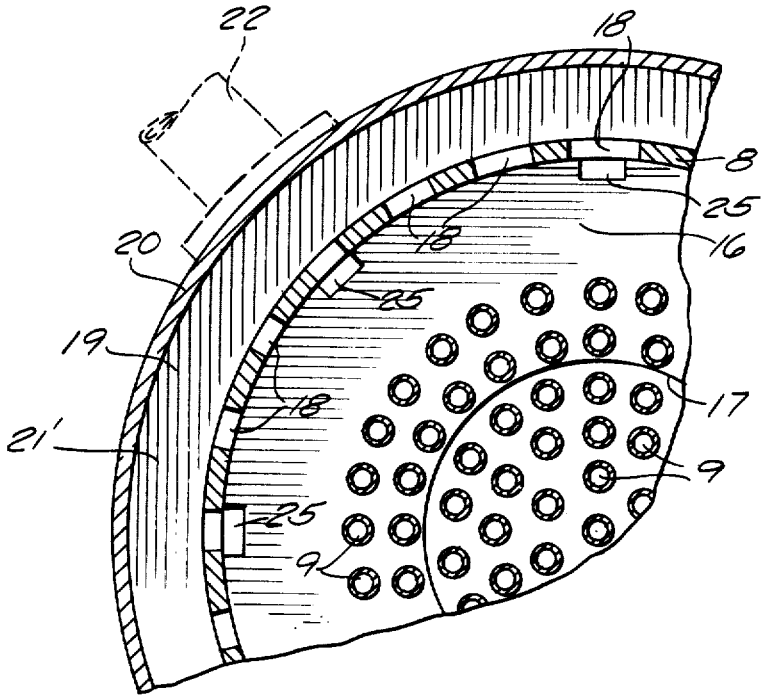
Figure 5:
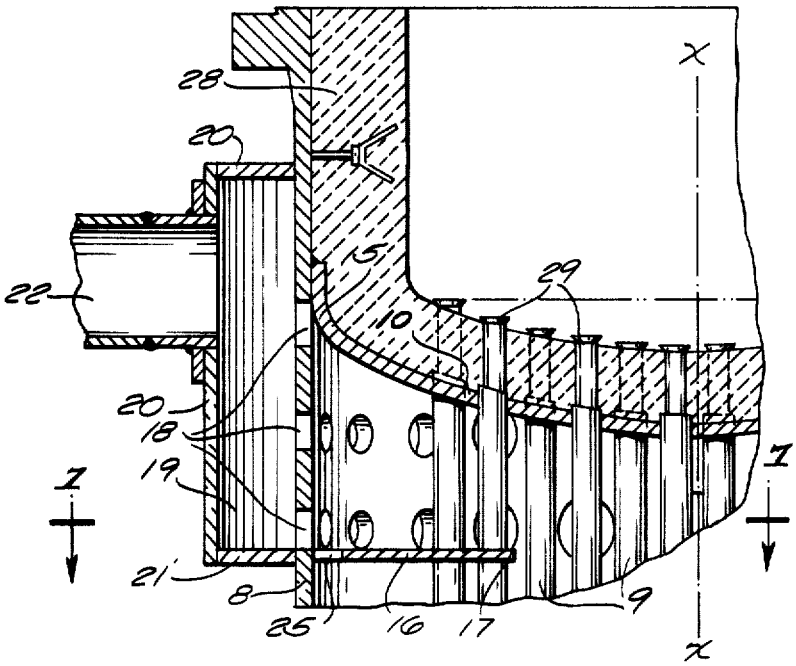
FIG. 5 is a vertical sectional view on a larger scale, through FIG. 2 on the plane of the line 5—5.
Figure 6:
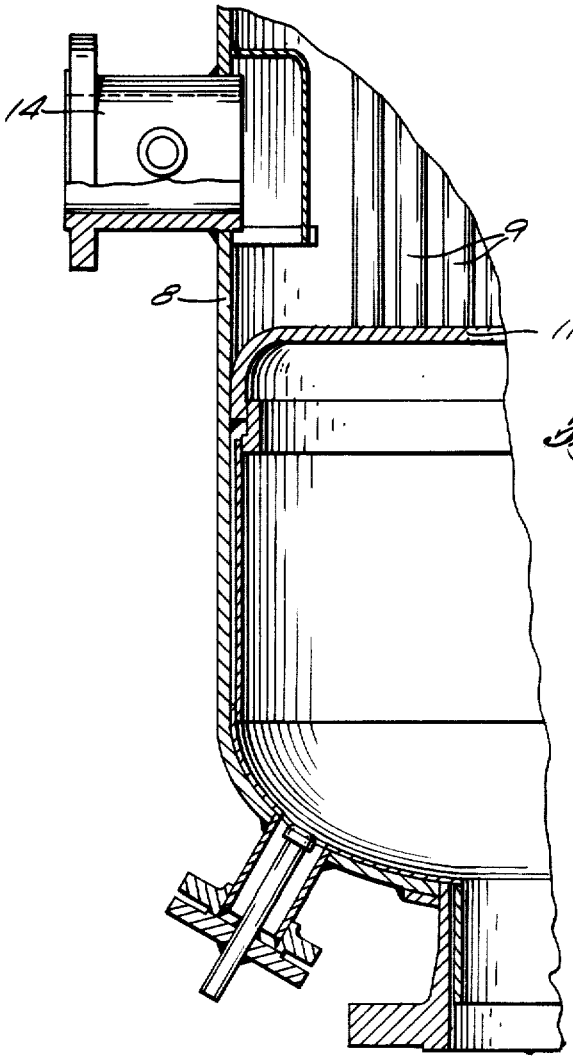

FIG. 6 is a vertical sectional view, also on a larger scale, through FIG. 3 on the plane of the line 6—6; and FIG. 7 (on sheet 4) is a horizontal cross sectional view through FIG. 5 on the plane of the line 7—7, but showing only part of the complete cross section to permit a feature of the invention to be better illustrated.

Referring now to the accompanying drawings in which like numerals identify like parts throughout the several views, the numeral 8 designates the outer cylindrical shell of a vertical firetube boiler embodying this invention. Within this shell there is a group or bank of vertical firetubes 9, the opposite ends of which are secured—by welding and rolling—to the edges of aligned holes in upper and lower tube sheets 10 and 11, respectively. The peripheral edges of the tube sheets are welded to the shell 8 so that the tube sheets, the tubes and the outer shell coact to define a closed upright vessel.

The top and bottom of this vessel are connected with a conventional steam drum 12, the bottom connection being formed by a feed line or downcomer 13 that leads from the steam drum to a water inlet 14. The manner in which the top of the closed vessel is connected with the steam drum will be described later but at this point it should be noted that during operation of the boiler its contents continually flow upward in indirect heat exchange relation with the hot gas flowing through the firetubes.

In the customary installation, the gas is conducted from its source through suitable ducting (not shown) that is connected to the flanged upper end of the outer shell 8, to the space above the upper tube sheet. This space thus serves as a manifold equally supplying all of the firetubes. The space beneath the lower tube sheet into which the tubes discharge the cooled gas is connected in any suitable manner with the processing system from which the gas emanated. In some situations it is more expedient to have the hot gases flow upwardly through the firetubes, but even then the problem solved by this invention was serious.

As pointed out hereinbefore, vertical firetube boilers that have been available before this invention had a very unimpressive reliability record. They could not cope with the accumulation of steam bubbles at the underside of the upper tube sheet. This undesirable consequence in the operation of those prior vertical firetube boilers—which was known as steam blanketing—placed such stress on the joints between the tubes and the tube sheet that in a relatively short time these connections failed. Even the tube sheet itself often ruptured.

This invention has eliminated steam blanketing by the combination of the shape of the upper tube sheet and the provision of means to direct the upwardly flowing boiler contents towards the center of the upper tube sheet. Thus, as shown in the drawings, and especially FIG. 5, the upper tube sheet has a dished formation. This locates its peripheral edge 15 at an elevation above that of its center, and assures that across its entire area the tube sheet is upwardly inclined from its central portion along every radius. By virtue of this shape of the upper tube sheet, the steam-water mixture in contact with its underside flows radially outward.

While the dished formation of the upper tube sheet is ideally suited to the purposes of the invention a conical shape could also be used.

Although the natural circulation of the boiler contents normally will result in the desired radially outward flow along the underside of the upper tube sheet, to assure that it takes place—and, more especially—to assure that this radially outward flow of the steam-water mixture will be positive and fast enough to wipe off any steam bubbles that might tend to adhere to the tube sheet, an annular baffle 16 is provided. This baffle extends inwardly from the outer shell to which it is welded, at an elevation a short distance below that of the upper tube sheet.

The radial dimension or width of the baffle 16 is such that its inner edge 17 is spaced approximately half the distance from the shell 8 to the central axis of the boiler identified by the line X—X in FIG. 5. The constricting effect of the baffle concentrates the upward flow of the boiler contents into a positive current that impinges the central portion of the tube sheet with sufficient force and velocity to prevent steam blanketing of the central portion of the tube sheet and assure that the radially outward flow of the steam-water mixture along the underside of the tube sheet is fast enough to sweep away any potential steam blanketing formations.

Directly above the annular baffle 16 there is a circular row or belt of holes 18 through the shell 8. Through these holes the steam-water mixture leaves the shell and enters an annular chamber 19 defined by a cylindrical wall 20 and top and bottom walls 21—21' that are welded to the shell 8.

At circumferentially equispaced locations the cylindrical side wall 20 has outlets 22 referred to in the industry as "releaser nozzles", through which the steam-water mixture leaves the annular chamber 19 to flow through piping 23 to the steam drum 12. There may be any even number of these outlets depending upon the size of the boiler. In the boiler here shown, there are four, connected in pairs by the piping 23.

It is important that the outlets 22 be at an elevation above the junctions of all of the firetubes with the upper tube sheet. Also, to avoid the accumulation of steam at the junction of the peripheral edge of the upper tube sheet with the shell 8, the uppermost of the holes 18 are directly adjacent to that junction.

Obviously, the collective area of the holes 18 must be sufficient to accommodate the total flow of steam-water mixture out of the top of the boiler, and—to guard against unequal flow off of the tube sheet around its circumference—the size of the holes is proportional to the locations of the outlets 22. Thus, as shown in FIG. 7, those holes 18 that are in line with or close to the outlets 22 are smaller than those that are progressively farther from the outlets 22. The resulting variation in resistance which the holes 18 impose upon the flow from the boiler assures uniform flow off of the tube sheet around its entire periphery.

To guard against the accumulation of steam bubbles under the baffle, vent openings 25 are provided at the baffle-to-shell joint. These vent openings are conveniently formed by notches cut into the peripheral edge of the baffle.

Figure 4:
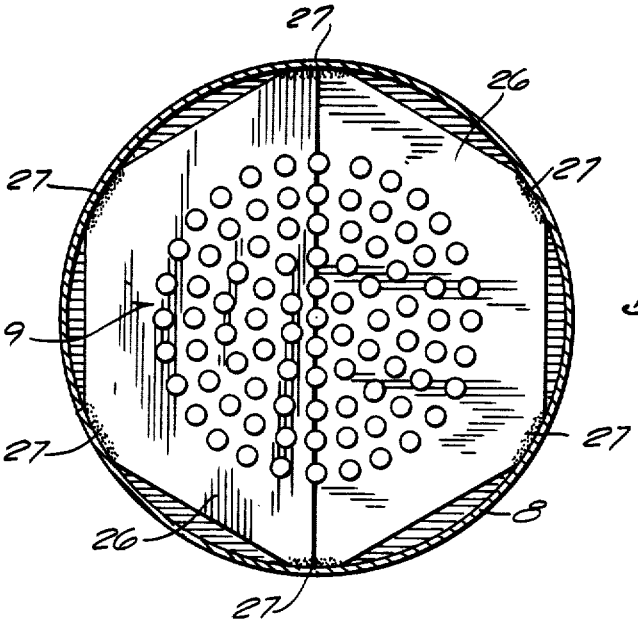
FIG. 4 is a horizontal cross sectional view through FIG. 1 on the plane of the line 4—4.

Between the tube sheets there are semicircular tube supporting sheets 26 that provide support for the tubes when the boiler is horizontally disposed, as when it is being shipped. As shown in FIG. 4, these tube supporting sheets are welded to the shell 8 at circumferentially spaced locations 27, and their intervening edges are straight and form chords to the cylindrical shell so as to minimize the baffling effect these sheets impose upon the upward flow of the boiler contents.

For service in situations in which the gas flows downwardly through the tubes and its entering temperature is high, it is preferable to line the top surface of the upper tube sheet and the inner surface of the shell above the tube sheet with a layer 28 of refractory material; and, to minimize the effect of the high heat transfer that would otherwise exist between the firetubes and the upper tube sheet at the junctions therebetween, ceramic or stainless steel ferrules 29 pass through the refractory layer covering the upper tube sheet and project into the upper end portions of the tubes. These ferrules not only guard against excessive transfer to the critical tube-to-tube sheet joint area, but also protect the refractory material against erosion.

Although not a part of this invention, a conical skirt 30 encircling and welded to the upper portion of the shell 8 provides a convenient way of supporting the boiler in its upright position of use.

The boiler is, of course, also provided with such customary features as blow-off inlets and spray nozzles through which pressurized cleaning solutions can be projected into the bottom of the boiler, but since these appurtenances form no part of the invention, they need no discussion.

Those skilled in the art will appreciate that the invention can be embodied in forms other than as herein disclosed for purposes of illustration.

The invention is defined by the following claims:

1. A boiler having vertical firetubes, upper and lower *tube* sheets to which the opposite ends of the firetubes are connected, an upright substantially cylindrical shell surrounding the firetubes in radially spaced relation to all of them and joined to the peripheral edges of the tube sheets to coact with the tube sheets in defining an upright closed vessel, and means including a downcomer outside the vessel for communicating the top and bottom of the vessel so that during operation of the boiler the vessel contents flow upwardly, said boiler being characterized by:

A. the upper tube sheet having its peripheral edge at a level substantially above its central portion, and being upwardly inclined outwardly from its central portion along every radius to induce radially outward flow of the vessel contents along the underside of the upper tube sheet;

B. an annular baffle projecting radially inward from the shell at a level below the junction of the shell with the upper tube sheet to direct the upwardly flowing vessel contents towards the axis of the vessel and against the center of the upper tube sheet to assure a positive radially outward flow of the vessel contents across the underside of the upper tube sheet that wipes away any steam bubbles in contact therewith; and

[C. the shell having circumferentially spaced holes closely adjacent to and below the peripheral edge of the upper tube sheet through which the steam-water mixture constituting the contents of the vessel leaves the same.]

*C. outlet means at the upper end portion of the shell adjacent to its junction with the peripheral edge of the upper tube sheet through which the steam-water mixture constituting the contents of the vessel leaves the same.*

2. The boiler of claim 1 further characterized by means forming circumferentially spaced vents through the radially outer edge portion of the baffle to prevent the accumulation of steam under the baffle.

3. The boiler of claim 1, [further characterized by:]

[D. means cooperating with and encircling the upper portion of the shell to define an annular chamber into which said holes open.]

*wherein said outlet means includes structure defining an annular chamber, and wherein said outlet means further comprises a plurality of holes through the wall of the shell at circumferentially spaced locations, communicating said annular chamber with the interior of the shell.*

4. The boiler of claim 3 wherein a portion of the shell projects above the level of the upper tube sheet and defines a wall of said annular chamber, and further characterized by:

a lining of refractory material over the radially inner surface of said portion of the shell and over the upper surface of the tube sheet, said lining holes aligned with the upper ends of the firetubes through which hot gases are admitted to the firetubes for downward flow therethrough.

5. The boiler of claim 3 wherein [at least two releaser nozzles open from said annular chamber, at symmetrically placed circumferentially spaced locations around the same, through which the contents of the annular chamber leave, and further characterized by:]

[said holes in the shell being of such sizes and so spaced from one another circumferentially around said annular chamber that those of said holes which are closest to the releaser nozzles offer greater resistance to the flow of the vessel contents into said annular chamber than those that are farthest from the releaser nozzles.]

*said outlet means further comprises at least two releaser nozzles opening from said annular chamber, at symmetrically placed circumferentially spaced locations around the same, through which the contents of the annular chamber leave, and further characterized by: said holes being arranged in a circle and being of such sizes and so spaced from one another that those of said holes which are closest to the releaser nozzles offer greater resistance to the flow of the discharging vessel contents into said annular chamber than those that are farthest from the releaser nozzles.*

* * * * *